United States Patent
Liou et al.

(10) Patent No.: US 8,502,924 B2
(45) Date of Patent: Aug. 6, 2013

(54) TELEVISION SIGNAL RECEIVER CAPABLE OF CANCELLING LINEAR AND NON-LINEAR DISTORTION

(75) Inventors: Ming-Luen Liou, Taipei County (TW); Yi-Fu Chen, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1450 days.

(21) Appl. No.: 11/934,892

(22) Filed: Nov. 5, 2007

(65) Prior Publication Data
US 2009/0115912 A1 May 7, 2009

(51) Int. Cl.
*H04N 5/44* (2011.01)

(52) U.S. Cl.
USPC .......................... 348/725; 348/726

(58) Field of Classification Search
USPC ................................. 348/725–726
See application file for complete search history.

(56) References Cited

U.S. PATENT DOCUMENTS

| | | | |
|---|---|---|---|
| 5,432,562 A | 7/1995 | Van de Waterlaat et al. | |
| 6,573,947 B1 | 6/2003 | Oh | |
| 7,239,358 B1 * | 7/2007 | Mayer | 348/731 |
| 7,605,838 B2 * | 10/2009 | Lee | 348/21 |
| 7,774,394 B2 * | 8/2010 | Menkhoff | 708/313 |
| 7,787,059 B2 * | 8/2010 | Kim et al. | 348/725 |
| 2002/0005912 A1 * | 1/2002 | Yanagi et al. | 348/725 |
| 2004/0061804 A1 * | 4/2004 | Favrat et al. | 348/554 |
| 2005/0243219 A1 * | 11/2005 | Yun et al. | 348/725 |
| 2007/0229707 A1 * | 10/2007 | Rumreich | 348/573 |

FOREIGN PATENT DOCUMENTS

CN 1280441 A 1/2001

OTHER PUBLICATIONS

CN Office Action mailed Mar. 11, 2010.
English abstract of CN1280441A, pub. Jan. 17, 2001.

* cited by examiner

*Primary Examiner* — Ngoc Vu
(74) *Attorney, Agent, or Firm* — McClure, Qualey & Rodack, LLP (57) ABSTRACT

A television signal receiver comprises: a tuner, an optional IF conditioner, an IF distortion canceller, and an IF demodulator. The tuner selects one channel from a radio frequency television signal to generate an intermediate frequency signal. The IF conditioner outputs an IF conditioned signal. The IF distortion canceller cancels a signal distortion in the IF signal or the IF conditioned signal to generate an IF distortion-cancelled signal. The IF demodulator demodulates the IF distortion-cancelled signal to output a baseband signal.

22 Claims, 11 Drawing Sheets

TELEVISION SIGNAL RECEIVER CAPABLE OF CANCELLING LINEAR AND NON-LINEAR DISTORTION

BACKGROUND OF THE INVENTION

1. Field of the Invention

The invention relates to a television signal receiver and in particular to a television signal receiver capable of cancelling linear and non-linear distortion.

2. Description of the Related Art

Figure 1:
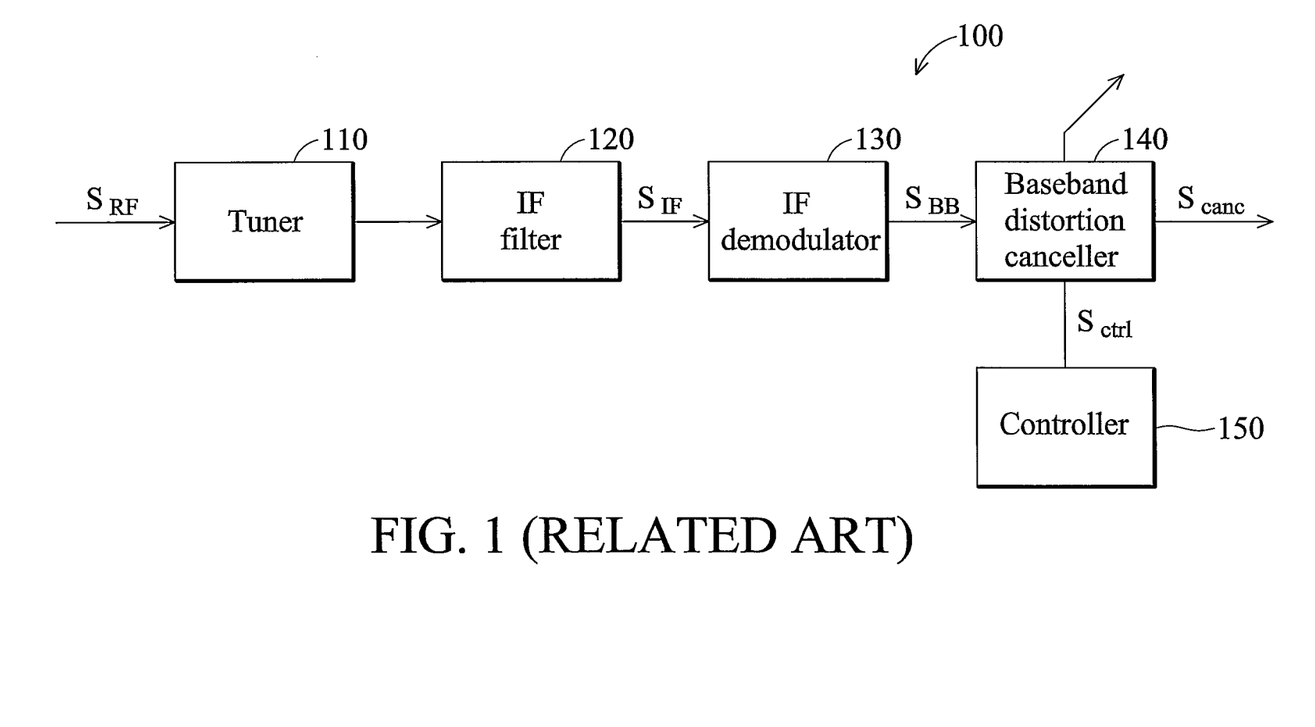
FIG. 1 shows a block diagram of a conventional television signal receiver.

Group delay distortion commonly existing in television signal receiver decreases signal quality, and needs to be cancelled. Please refer to FIG. 1. FIG. 1 shows a block diagram of a conventional television signal receiver 100. The television signal receiver 100 includes a tuner 110, an intermediate frequency (IF) filter 120, an intermediate frequency (IF) demodulator 130, a baseband distortion canceller 140, and a controller 150. The receiver 100 receives a radio frequency (RF) television signal $S_{RF}$ from a transmitter (not shown). The tuner 110 selects one channel from the RF television signal $S_{RF}$, and down-converts the selected channel from RF band to IF band. The IF filter 120 filters the selected channel to generate an IF filtered signal $S_{IF}$. The IF demodulator 130 demodulates the IF filtered signal $S_{IF}$ to generate a baseband signal $S_{BB}$. The baseband distortion canceller 140 cancels a group delay distortion in the baseband signal $S_{BB}$ to output a distortion-cancelled signal $S_{canc}$. After cancelling the group delay distortion, the distortion-cancelled signal $S_{canc}$ meets the requirement of a flat group delay response. Finally, the distortion-cancelled signal $S_{canc}$ is sent to the television. Additionally, a controller 150 generates a control signal $S_{ctrl}$ to program the baseband distortion canceller 140 to cancel the group delay distortion. A detailed description of cancelling the group delay distortion is provided in the following.

Figure 2:
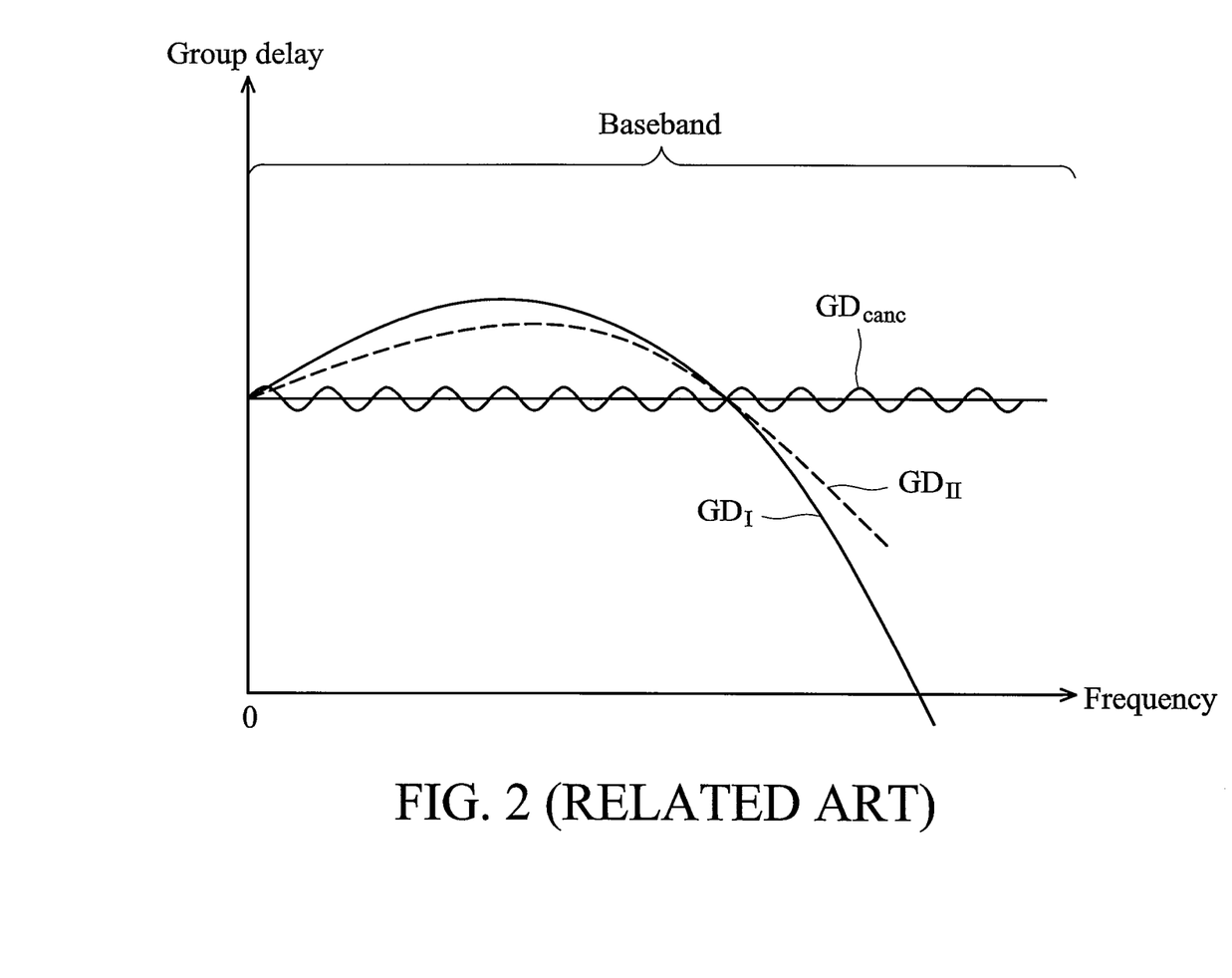
FIG. 2 shows a plurality of curves of the group delay response.

Please refer to FIG. 2. FIG. 2 shows a plurality of curves of the group delay response. The baseband distortion canceller 140 provides programmable group delay (such as curves $GD_I$ and $GD_{II}$) to cancel the group delay distortion of the receiver circuitry 100. After cancellation, the group delay response of the receiver circuitry becomes flat (see the curve $GD_{canc}$). Ideally, the group delay response of the receiver circuitry 100 should be flat (the curve of which is similar to curve $GD_{canc}$) and hence the baseband distortion canceller 140 would be unnecessary. In practice, due to the various group delay pre-correction transmitted from various transmitters and the deviation of IF filter group delay of various IF filters 120, the group delay response of the receiver circuitry 100 is not flat. The above-mentioned group delay precorrection is performed at the transmitter. Various broadcasters may send the RF television signals with various group delay precorrections (e.g. half, full, or no precorrection). The above-mentioned IF filter group delay is a characteristic of the IF filter (filter 120) at the receiver. Various IF filters may have various IF filter group delays. An adequate IF filter has an almost flat IF filter group delay while an inadequate IF filter has an uneven IF filter group delay. Therefore, the baseband distortion canceller 140 must provide various programmable group delay (such as curves $GD_I$ and $GD_{II}$) to cancel various group delay precorrections and IF filter group delays in different situations.

As one can see, the conventional baseband distortion canceller is capable of cancelling the group delay distortion in the baseband stage. As to distortion characteristic, the group delay distortion is a type of linear distortion, and the characteristic of which is substantially invariant in each stage (RF, IF, and baseband) of the receiver circuitry. The characteristic of non-linear distortion, however, changes in different stages. In other words, the non-linear distortion is hard to be processed and cancelled in the baseband stage since the characteristic is already changed in the demodulation process performed in the IF demodulator. Hence, the conventional baseband distortion canceller is hard to cancel the non-linear distortion.

BRIEF SUMMARY OF THE INVENTION

A detailed description is given in the following embodiments with reference to the accompanying drawings.

A television signal receiver is provided. The television signal receiver comprises: a tuner, an optional IF conditioner, an IF distortion canceller, and an IF demodulator. The tuner selects one channel from a radio frequency television signal to generate an intermediate frequency signal. The IF conditioner outputs an IF conditioned signal. The IF distortion canceller cancels a signal distortion in the IF signal or the IF conditioned signal depending on the presence of IF conditioner to generate an IF distortion-cancelled signal. The IF demodulator demodulates the IF distortion-cancelled signal to output a baseband signal.

A method of receiving an RF television signal is provided. The method comprises: selecting one channel from the RF television signal to generate an intermediate frequency signal; optionally conditioning the IF signal; canceling a signal distortion in the IF conditioned signal to generate an IF distortion-cancelled signal; demodulating the IF distortion-cancelled signal to output a baseband signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
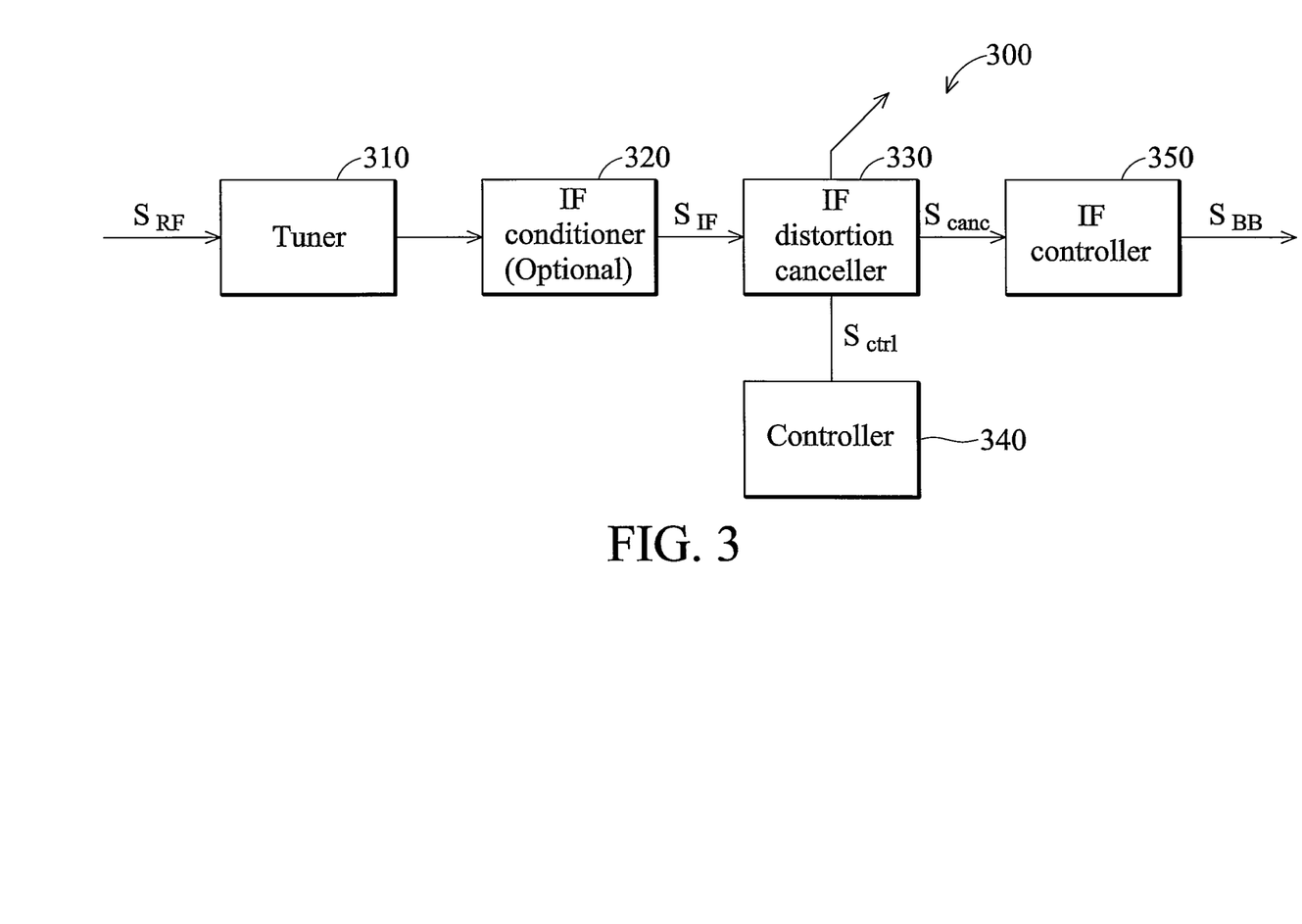
FIG. 3 shows a block diagram of a television signal receiver according to an embodiment of the present invention.

Please refer to FIG. 3. FIG. 3 is a block diagram of an embodiment of a television signal receiver 300. The television signal receiver 300 comprises a tuner 310, an optional IF conditioner 320, an IF distortion canceller 330, a controller 340, and an IF demodulator 350. The major difference between the conventional television signal receiver shown in FIG. 1 and this embodiment is that the operational signal of the distortion canceller changes from the baseband signal (generated after the demodulation process in the IF demodulator) to the IF conditioned signal (before the demodulation process in the IF demodulator). The IF distortion canceller 330 of the invention can process not only the linear distortion but also the non-linear distortion prior to the demodulation process. In the demodulation process, the non-linear distortion changes its characteristic and is hard to be cancelled after that. Additionally, the IF distortion canceller 330 is programmable and the controller 340 sends a control signal $S_{ctrl}$ to program the IF distortion canceller 330. A detailed description of programming the IF distortion canceller 330 will be provided later. The optional IF conditioner 320 provides basic IF signal processing like filtering, amplification, mixing, or quantization. Depending on the discretion of those implementing this invention, the IF conditioner may include as simple as an IF filter to further reject unwanted interference, may include an amplifier to adjust the IF signal power level, may contain a frequency shifter to move the signal spectrum over the IF band, may enclose a quantizer to digitize the signal, or may constitute an arrangement of some or all the above practices, which are all well know and commonly adopted. As the circuitry used in the IF conditioner are potential sources of linear and non-linear distortion in the IF conditioned signal, it is preferred that the IF distortion canceller be placed after the IF conditioner to cancel the distortion generated by the IF conditioner. As to other elements (310 and 350), because the operation and functionality are similar to conventional elements, further discussion is omitted for the sake of brevity. A detailed description of the IF distortion canceller 330 is provided below.

Figure 4:
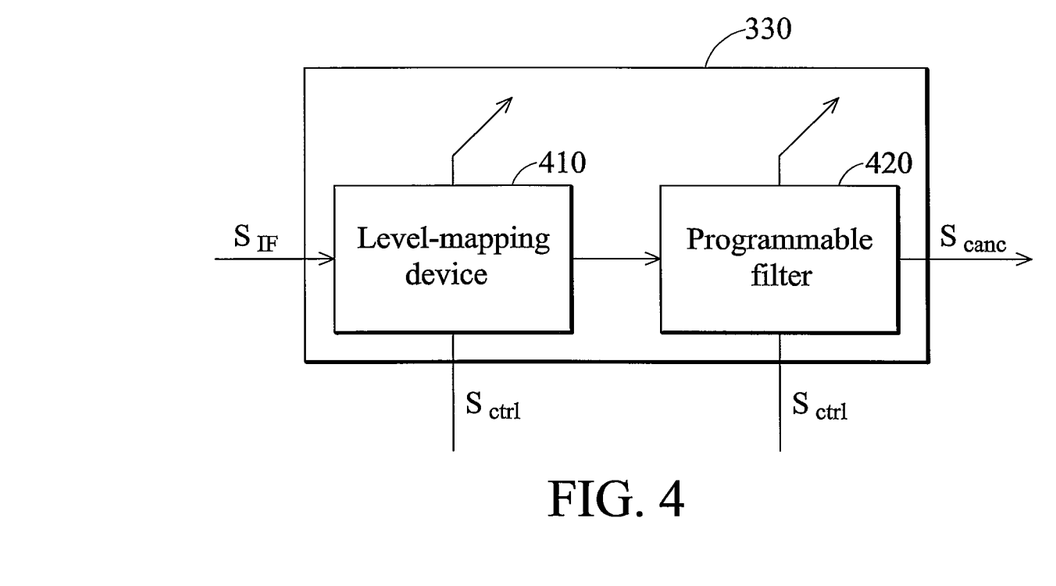
FIG. 4 shows a block diagram of the IF distortion canceller of FIG. 3.

Please refer to FIG. 4. FIG. 4 is a block diagram of an embodiment of the IF distortion canceller 330 in FIG. 3. The IF distortion canceller 330 comprises a level-mapping device 410 and a programmable filter 420. The level-mapping device 410 cancels the aggregate transfer curve distortion (a type of non-linear distortion) of the tuner 310 and the IF conditioner 320, while the programmable filter 420 cancels the group delay distortion (a type of linear distortion) before demodulation. Detailed description of canceling the transfer curve distortion and the group delay distortion will be provided later (respectively in FIG. 5 and FIG. 6). Please note that the invention does not limit the type of distortion to be cancelled. The above-mentioned distortions (transfer curve distortion and group delay distortion) only serve as examples. In some embodiments, the IF distortion canceller 330 further comprises an amplitude distortion canceller for cancelling the amplitude response distortion (a type of linear distortion). In some other embodiments, the programmable filter 420 is implemented as a digital filter with adaptable coefficients and hence capable of simultaneously cancelling two linear distortions: amplitude response distortion and group delay distortion. A detailed description of the level-mapping device 410 for cancelling the transfer curve distortion (non-linear distortion) is provided below.

Figure 5A:
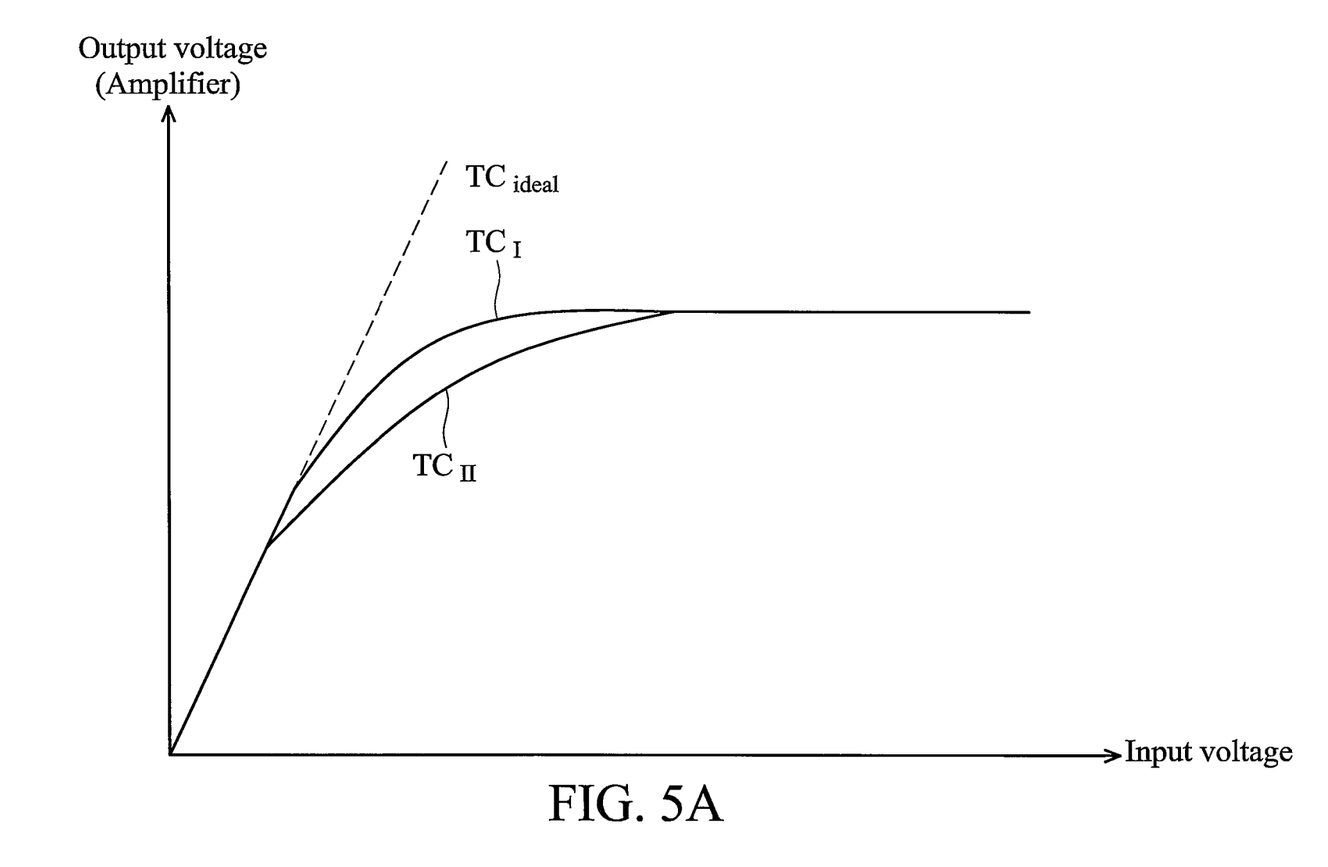
FIG. 5A shows various transfer curves in a receiver amplifier.
Figure 5B:
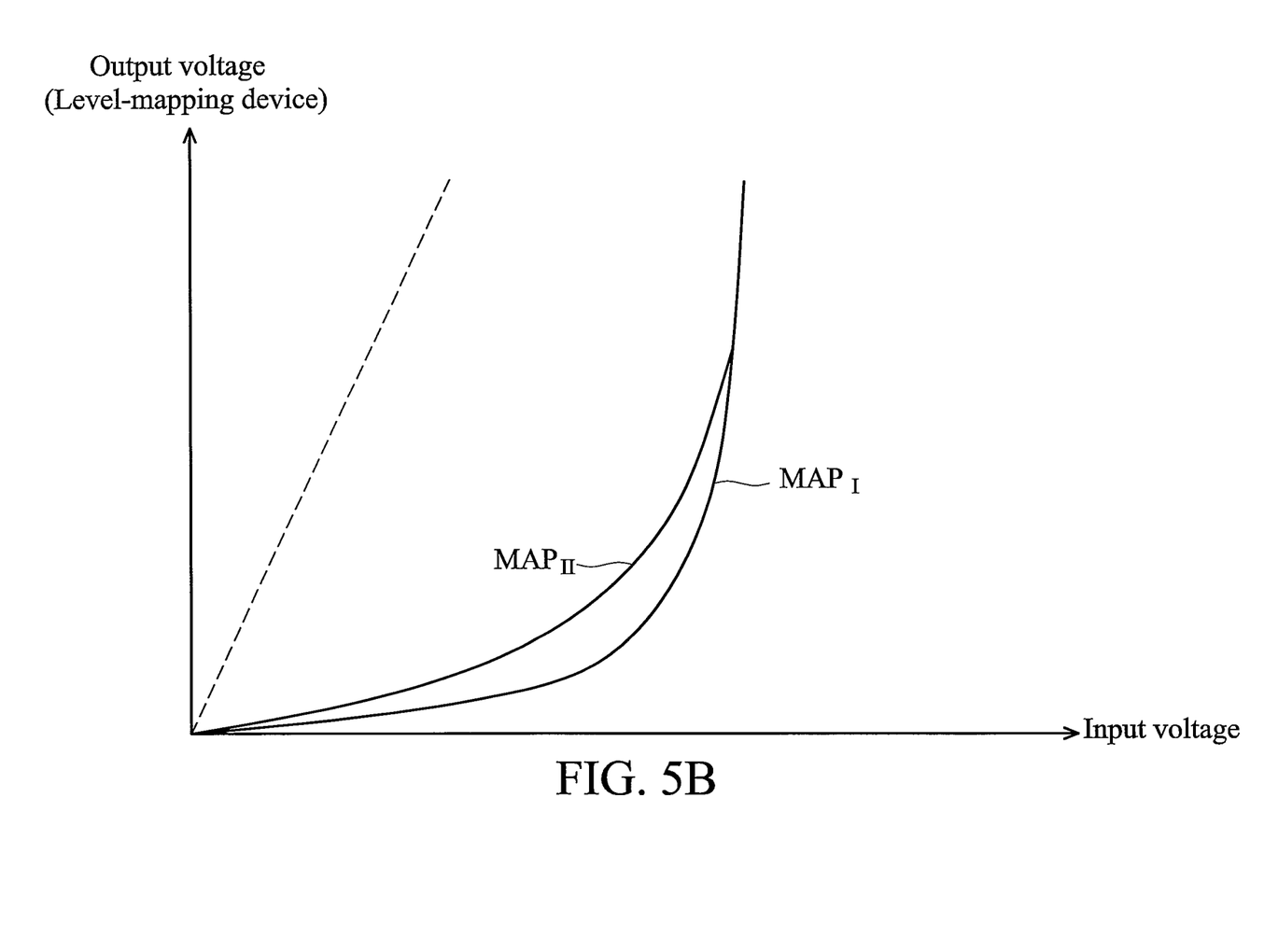
FIG. 5B shows various mapping curves in a mapping-level device.
Figure 5C:
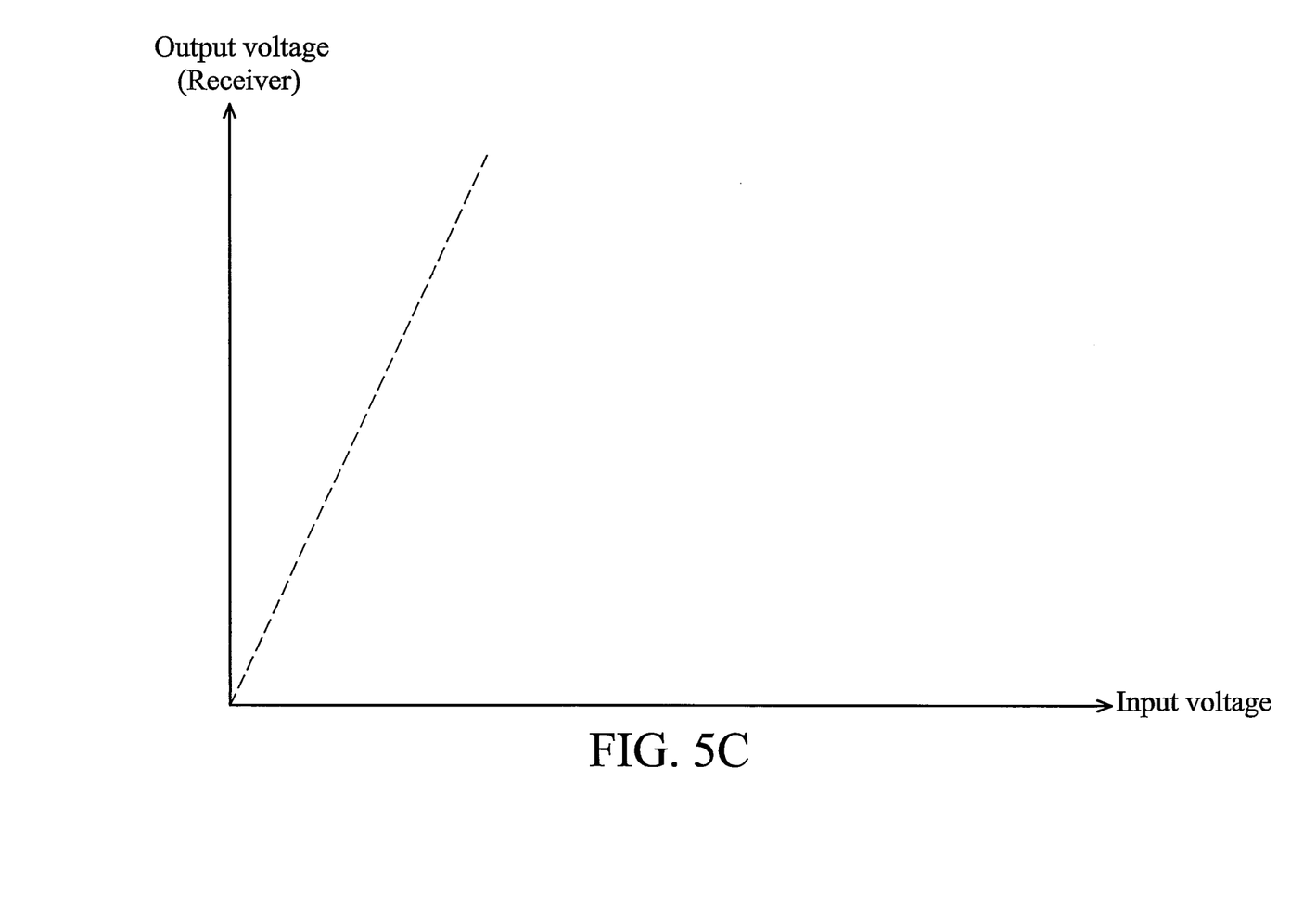
FIG. 5C shows the final transfer curve in a receiver circuitry after cancelling distortion.

Please refer to FIGS. 5A~5C. FIG. 5A shows various transfer curves in various tuners and IF conditioners while FIG. 5B shows various mapping curves in the mapping-level device 410. FIG. 5C shows the final transfer curve in the receiver circuitry 300 after cancelling distortion. A transfer curve is an aggregate characteristic of circuitry such as amplifiers or mixers implemented in the tuner 310 and the IF conditioner 320. The slope of the transfer curve is the voltage gain of the circuitry. In an ideal circuit, the transfer curve is a straight line and the slope (voltage gain) is always constant (see the ideal transfer curve $TC_{ideal}$ in FIG. 5A). In practice, there is no ideal circuit. The transfer curve of an actual circuit is straight in the beginning and saturates gradually. This is referred to as the transfer curve distortion (a type of non-linear distortion). Various circuits may have various transfer curve distortion characteristics (see the exemplary transfer curves $TC_I$ and $TC_{II}$ in FIG. 5A). Please refer to FIG. 5B. In order to cancel the transfer curve distortion, the level-mapping device 410 is configured to provide the transposed curve of the non-straight transfer curve of the circuit as its mapping curve (see exemplary mapping curves $MAP_I$ and $MAP_{II}$ in FIG. 5B). In this example, the mapping curve $MAP_I$ corresponds to the transfer curve $TC_I$ while the mapping curve $MAP_{II}$ corresponds to the transfer curve $TC_{II}$.

Examples of cancelling the transfer curve distortion are provided as follows. If, for example, the transfer curve of the tuner and the IF conditioner circuitry is $TC_I$, the level-mapping device 410 is configured to provide the mapping curve $MAP_I$ to cancel the transfer curve distortion. If, as another example, the transfer curve of the tuner and the IF conditioner circuitry is $TC_{II}$, the level-mapping device 410 is configured to provide another mapping curve $MAP_{II}$ to cancel the transfer curve distortion. Please refer to FIG. 5C. After cancellation, the final transfer curve turns into an actual linear line (see the curve $TC_{canc}$) and the transfer curve distortion in the receiver circuitry is cancelled. Additionally, the configuration of a mapping curve in the level-mapping device 410 is controlled by control signal $S_{ctrl}$. The control signal $S_{ctrl}$ may send a mapping table, a mapping function, or an instruction to the level-mapping device 410 to setup and utilize a proper mapping curve.

Figure 6A:
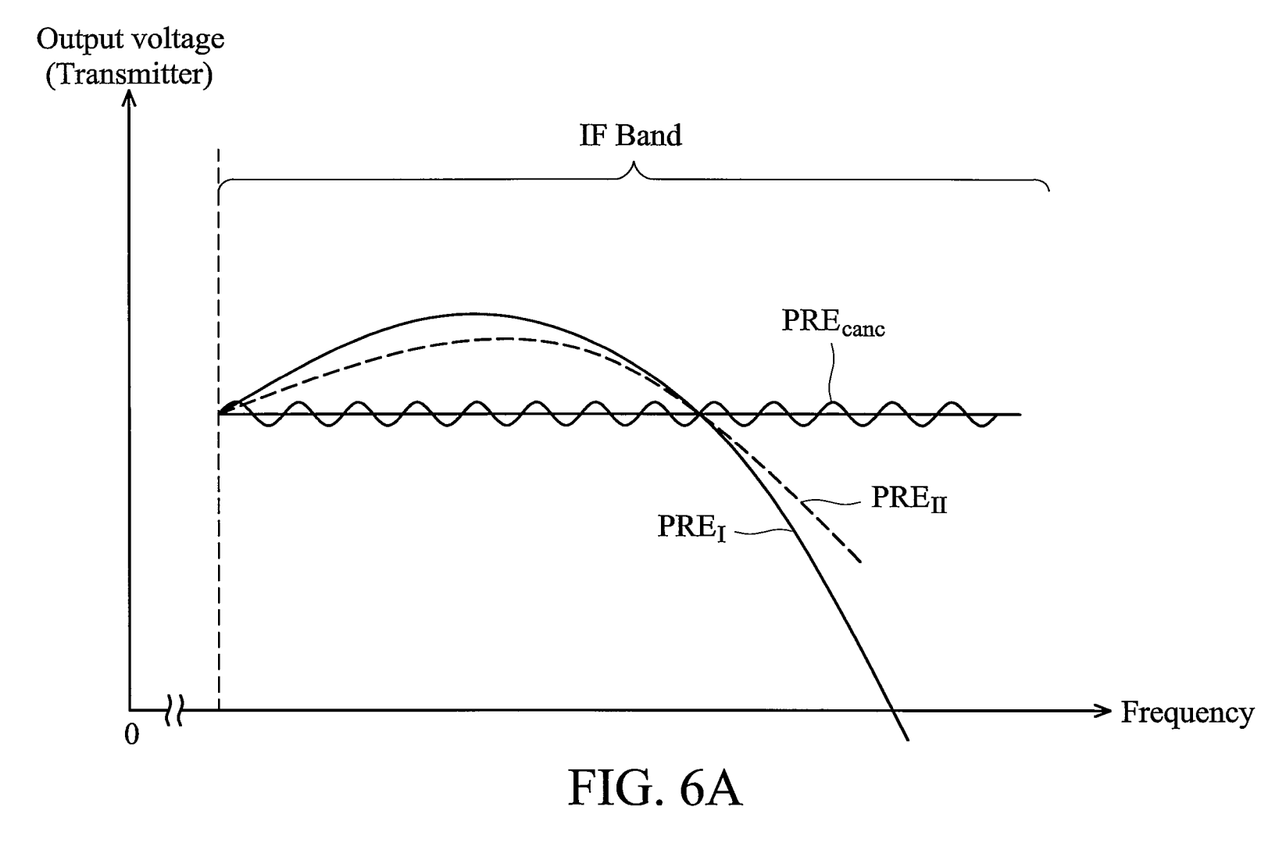
FIG. 6A shows various group delay precorrection curves in the transmitter.
Figure 6B:
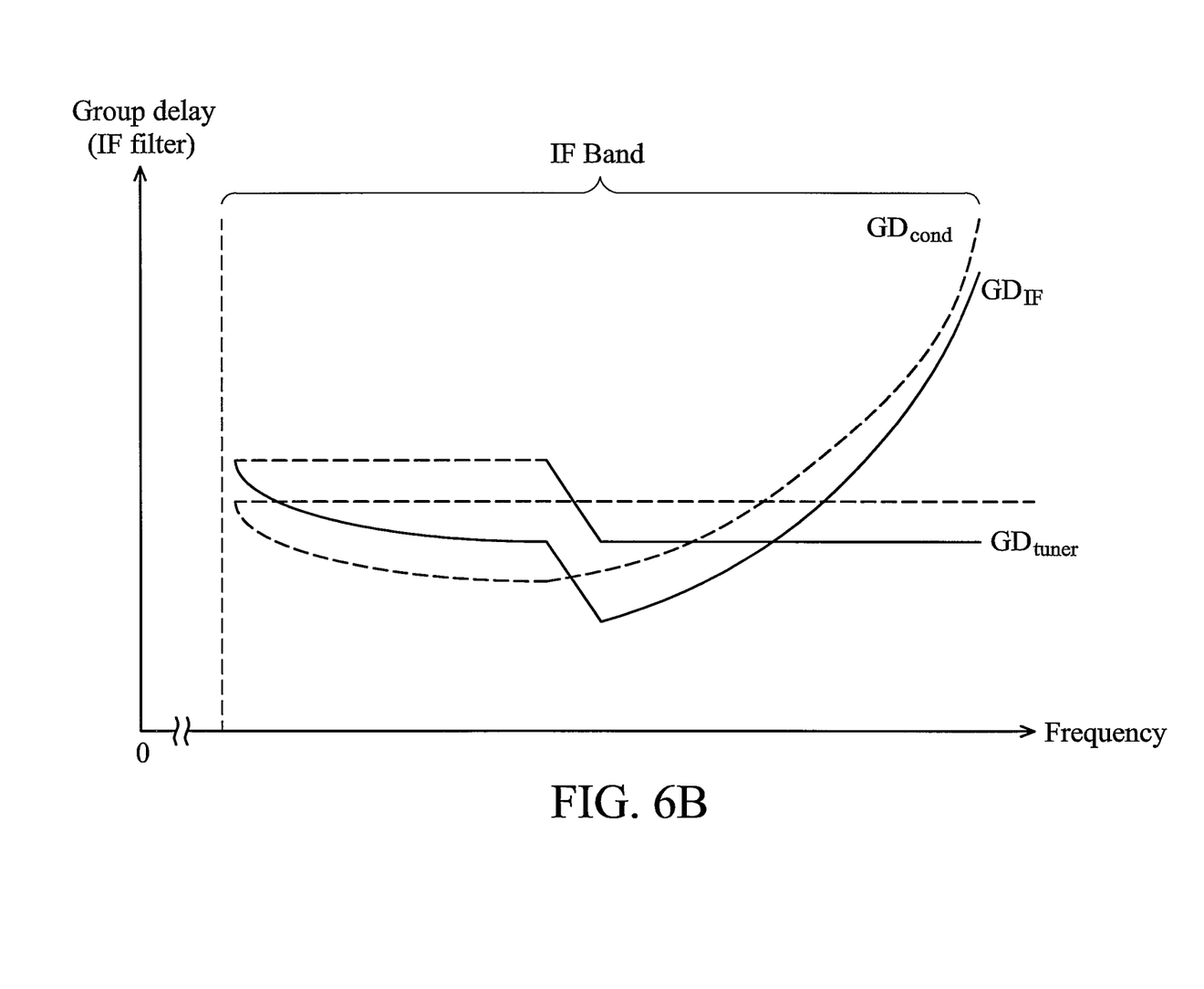
FIG. 6B shows an exemplary curve of the aggregate group delay response in the IF tuner and the IF conditioner.
Figure 6C:
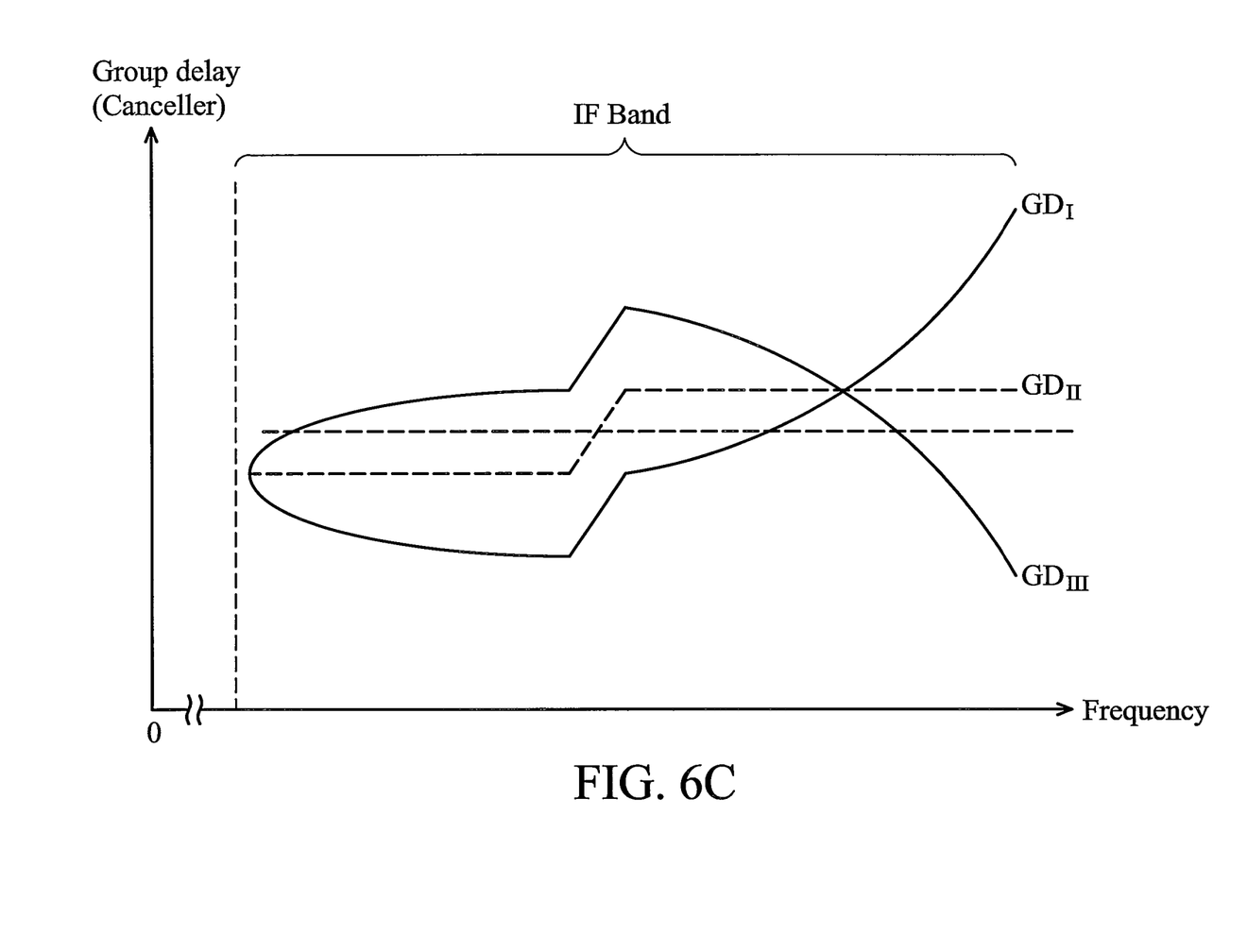
FIG. 6C shows various curves of the group delay response in the IF distortion canceller.
Figure 6D:
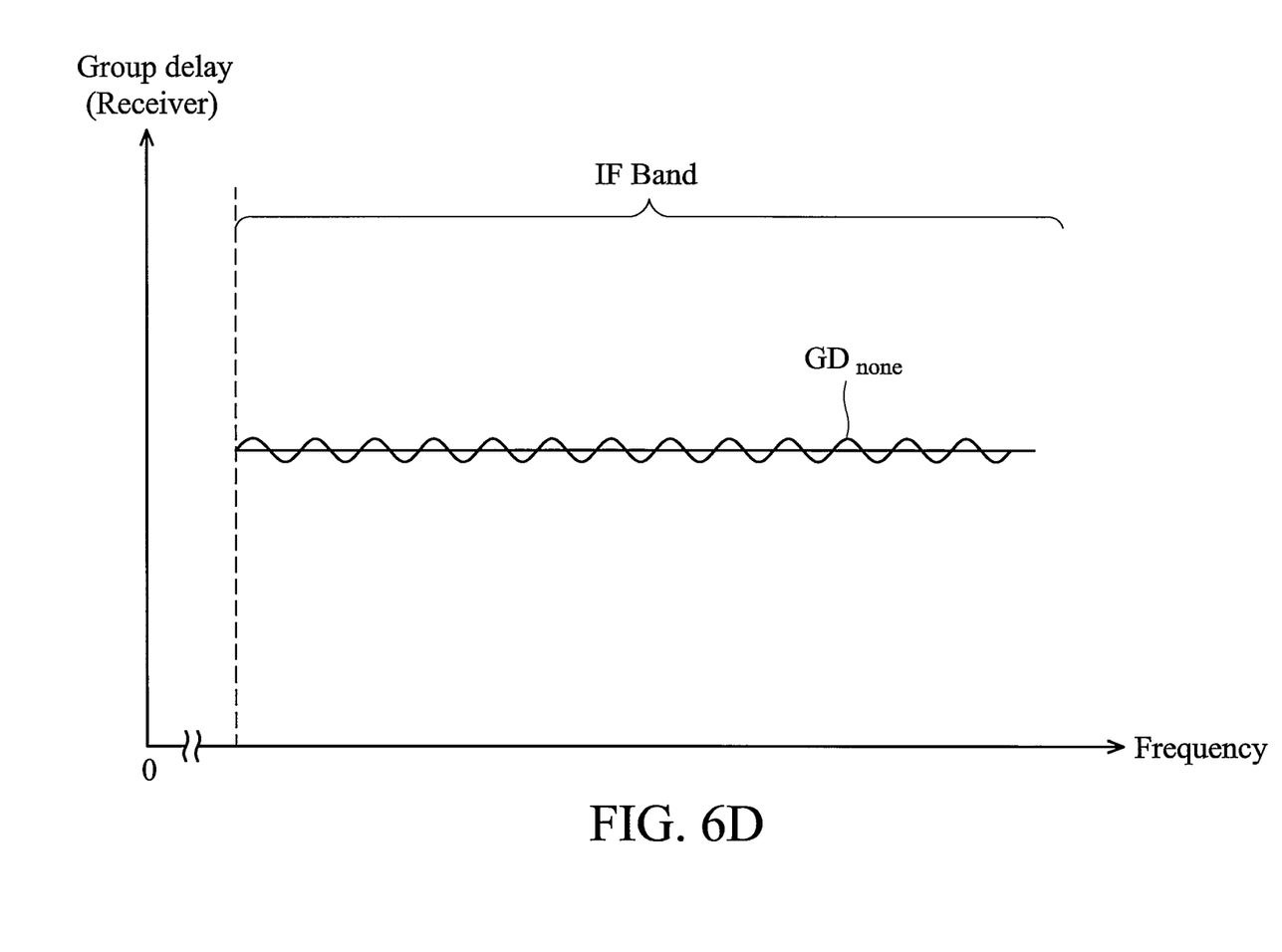
FIG. 6D shows the final group delay response in the receiver circuitry after cancelling distortion.

A detailed description of the programmable filter 420 for cancelling another kind of distortion (group delay distortion) is provided below. Please refer to FIGS. 6A~6D. FIG. 6A shows various group delay precorrection curves in the transmitter (not shown). FIG. 6B shows exemplary curves of the aggregate group delay response in the tuner 310 and the IF conditioner 320 while FIG. 6C shows various curves of the group delay response in the IF distortion canceller 330. FIG. 6D shows the final group delay response in the receiver circuitry 300 after cancelling distortion. The broadcaster may provide the RF signals with full group delay precorrection (curve $PRE_{full}$ in FIG. 6A), half group delay precorrection (curve $PRE_{half}$ in FIG. 6A), or no group delay precorrection (curve $PRE_{none}$ in FIG. 6A) from the transmitter. Please refer to FIG. 6B. The group delay response of the tuner 310 may be the curve $GD_{tuner}$, while the group delay response of the IF conditioner may be the curve $GD_{cond}$. The aggregate group delay response curve $GD_{IF}$ is the superposition of $GD_{tuner}$ and $GD_{cond}$ due to the linear nature of the group delay distortion. Please note that a group delay distortion results from a non-flat group delay response, which is a characteristic of the circuitry used in the tuner and the IF conditioner. Therefore, the aggregate group delay response depends on the specific implementation of the tuner and the IF conditioner and its curve may not resemble the exemplary curve $GD_{IF}$ given in FIG. 6B.

Please refer to FIG. 6C. In this embodiment, if the half group delay precorrection (curve $PRE_{half}$ in FIG. 6A) is cancelled by the group delay of IF conditioner ($GD_{cond}$ given in FIG. 6B), the programmable filter 420 can be configured to provide group delays (see curves $GD_I$, $GD_{II}$, $GD_{III}$) to cancel the superposition group delay distortion introduced from the various precorrection in the transmitter ($PRE_{full}$, $PRE_{half}$ and $PRE_{none}$ in FIG. 6A) and the aggregate group delay distortion of the tuner and the IF conditioner ($GD_{IF}$ in FIG. 6B) respectively. In other words, the distortion introduced by the full group delay precorrection (curve $PRE_{full}$ in FIG. 6A) and the aggregate group delay distortion of the tuner and the IF conditioner ($GD_{IF}$ in FIG. 6B) is cancelled or compensated by programmable filter 420 which is configured to provide group delay curve $GD_I$. The distortion introduced by the half group delay precorrection (curve $PRE_{half}$ in FIG. 6A) and the aggregate group delay distortion of the tuner and the IF conditioner ($GD_{IF}$ in FIG. 6B) is cancelled or compensated by programmable filter 420 which is configured to provide group delay curve $GD_{II}$. The distortion introduced by the no group delay precorrection (curve $PRE_{none}$ in FIG. 6A) and the aggregate group delay distortion of the tuner and the IF conditioner ($GD_{IF}$ in FIG. 6B) is cancelled or compensated by programmable filter 420 which is configured to provide group delay curve $GD_{III}$. Therefore, the group delay response at the output of the IF distortion canceller 330 is flat.

Please note that the programmable filter 420 cancels the group delay distortion to generate the distortion-cancelled signal $S_{canc}$ before the IF demodulator, not after the IF demodulator. In other words, the distortion-cancelled signal $S_{canc}$ is still an IF signal requiring further demodulation process to become a baseband signal acceptable to a TV. (The conventional distortion-cancelled signal $S_{canc}$ is already a baseband signal like CVBS). The distortion-cancelled signal $S_{canc}$ is then sent to the IF demodulator 350 (see FIG. 3) to generate the baseband signal $S_{BB}$. Additionally, the group delay response curve in the programmable filter 420 is configured by the control signal $S_{ctrl}$. The control signal $S_{ctrl}$ may send a plurality of coefficients (e.g. finite impulse response coefficients in case of programmable digital filters) or an instruction to the programmable filter 420 to setup and utilize a proper curve of group delay response. Please refer to FIG. 6D. After cancellation, the group delay response of the receiver circuitry turns into a generally flat curve (see the curve $GD_{canc}$).

Compared with the conventional distortion cancellers, the operational band of the inventive distortion canceller moves from the baseband to the IF band. At the IF band, the characteristic of non-linear distortion has not yet been destroyed and hence the IF distortion canceller of the invention can cancel the non-linear distortion. In other words, the IF distortion canceller of the invention can cancel both linear and non-linear distortion while the conventional baseband distortion canceller can only cancel the linear distortion.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A television signal receiver, comprising:
   a tuner for selecting one channel from a radio frequency (RF) television signal to generate an intermediate frequency (IF) signal;
   an IF distortion canceller coupled to the tuner for canceling a signal distortion in the IF signal to generate an IF distortion-cancelled signal, wherein the IF distortion canceller comprises a front-end portion having an input to receive the IF signal and cancel non-linear distortion in the IF signal, wherein the IF distortion canceller further comprising a back-end portion having an input to receive an output of the front-end portion and cancel linear distortion carried in the IF signal, the back-end portion outputting the IF distortion-cancelled signal; and
   an IF demodulator coupled to the IF distortion canceller for demodulating the IF distortion-cancelled signal to output a baseband signal.

2. The television signal receiver as claimed in claim 1, wherein the IF distortion canceller comprises:
   non-linear distortion canceling circuitry operated at an IF band for canceling the non-linear distortion in the IF signal.

3. The television signal receiver as claimed in claim 2, wherein the non-linear distortion canceling circuitry comprises:
   a level-mapping device having a programmable transfer curve for canceling a tuner transfer curve distortion.

4. The television signal receiver as claimed in claim 1, wherein the IF distortion canceller comprises:
   linear distortion canceling circuitry operated at an IF band for canceling the linear distortion in the IF signal.

5. The television signal receiver as claimed in claim 4, wherein the linear distortion canceling circuitry comprises:
   an amplitude distortion canceller having a programmable amplitude response for canceling an amplitude response distortion;
   wherein the amplitude response distortion comprises a tuner amplitude response from the tuner.

6. The television signal receiver as claimed in claim 4, wherein the linear distortion canceling circuit comprises:
   a programmable filter having a programmable group delay for canceling a group delay distortion;
   wherein the group delay distortion comprises a group delay precorrection performed by a transmitter, and a tuner group delay from the tuner.

7. The television signal receiver as claimed in claim 4, wherein the linear distortion canceling circuitry comprises:
   a programmable digital filter having a programmable amplitude response and a programmable group delay for canceling an amplitude response distortion and a group delay distortion;
   wherein the amplitude response distortion comprises an amplitude response distortion from the tuner;
   wherein the group delay distortion comprises a group delay precorrection performed by a transmitter, and a tuner group delay form the tuner.

8. The television signal receiver as claimed in claim 1 further comprising:
   a controller coupled to the IF distortion canceller for generating a control signal to program the IF distortion canceller to cancel distortion in the IF signal.

9. A television signal receiver, comprising:
   a tuner for selecting one channel from a radio frequency (RF) television signal to generate an intermediate frequency (IF) signal;
   an IF conditioner coupled to the tuner for conditioning the IF signal to generate an IF conditioned signal;
   an IF distortion canceller coupled to the IF conditioner for canceling a signal distortion in the IF conditioned signal to generate an IF distortion-cancelled signal, wherein the IF distortion canceller comprises a front-end portion having an input to receive the IF conditioned signal and cancel non-linear distortion in the IF signal, wherein the IF distortion canceller further comprising a back-end portion having an input to receive an output of the front-end portion and cancel linear distortion carried in the IF signal, the back-end portion outputting the IF distortion-cancelled signal; and an IF demodulator coupled to the IF distortion canceller for demodulating the IF distortion-cancelled signal to output a baseband signal.

10. The television signal receiver as claimed in claim 9, wherein the IF conditioner comprises:

an IF filter for filtering the IF signal.

11. The television signal receiver as claimed in claim 9, wherein the IF conditioner comprises:

an amplifier for adjusting a signal power level of the IF signal.

12. The television signal receiver as claimed in claim 9, wherein the IF conditioner comprises:

a quantizer for digitizing the IF signal.

13. The television signal receiver as claimed in claim 9, wherein the IF conditioner comprises:

a frequency shifter for moving a signal spectrum of the IF signal to an IF band in a predetermined depth.

14. The television signal receiver as claimed in claim 9, wherein the IF distortion canceller cancels a signal distortion generated by the IF conditioner.

15. A method of receiving a radio frequency (RF) signal, comprising:

selecting one channel from the RF signal to generate an intermediate frequency (IF) signal;

canceling a non-linear signal distortion in the IF signal to generate an intermediate conditioned signal;

canceling a linear signal distortion in the intermediate conditioned signal to generate an IF distortion-cancelled signal; and demodulating the IF distortion-cancelled signal to output a baseband signal.

16. The method as claimed in claim 15, wherein the step of canceling the non-linear signal distortion comprises:

canceling an amplifier transfer curve distortion.

17. The method as claimed in claim 15, wherein canceling the linear signal distortion comprises canceling an amplitude response distortion; and canceling a group delay distortion;

wherein the group delay distortion comprises a group delay precorrection and a selecting group delay introduced during the step of selecting one channel from the RF television signal.

18. A method of receiving a radio frequency (RF) signal, comprising:

selecting one channel from the RF signal to generate an intermediate frequency (IF) signal;

conditioning the IF signal to generate an IF conditioned signal;

canceling a non-linear signal distortion in the IF conditioned signal to generate an intermediate conditioned signal;

canceling a linear signal distortion in the intermediate conditioned signal to generate an IF distortion-cancelled signal; and demodulating the IF distortion-cancelled signal to output a baseband signal.

19. The method as claimed in claim 18, wherein the step of conditioning the IF signal comprises:

filtering the IF signal.

20. The method as claimed in claim 18, wherein the step of conditioning the IF signal comprises:

adjusting a signal power level of the IF signal.

21. The method as claimed in claim 18, wherein the step of conditioning the IF signal comprises:

digitizing the IF signal.

22. The method as claimed in claim 18, wherein the step of conditioning the IF signal comprises:

moving a signal spectrum of the IF signal to an IF band in a predetermined depth.

* * * * *